No. 773,498. PATENTED OCT. 25, 1904.
L. E. HERRON.
TRACK DRYING DEVICE.
APPLICATION FILED MAY 23, 1904.
NO MODEL.

Witnesses:

Inventor
L. E. Herron,
By
Attorneys.

No. 773,498.

Patented October 25, 1904.

UNITED STATES PATENT OFFICE.

LAWRENCE E. HERRON, OF WILKINSBURG, PENNSYLVANIA, ASSIGNOR OF ONE-FOURTH TO S. V. REEVES, OF PITTSBURG, PENNSYLVANIA.

TRACK-DRYING DEVICE.

SPECIFICATION forming part of Letters Patent No. 773,498, dated October 25, 1904.

Application filed May 23, 1904. Serial No. 209,278. (No model.)

*To all whom it may concern:*

Be it known that I, LAWRENCE E. HERRON, a citizen of the United States of America, residing at Wilkinsburg, in the county of Allegheny and State of Pennsylvania, have invented certain new and useful Improvements in Track-Drying Devices, of which the following is a specification, reference being had therein to the accompanying drawings.

This invention has relation to track-drying devices, and has for its object the provision of novel means whereby the tracks forming the construction of a traction system or a railroad may be dried to facilitate the traveling of the rolling-stock thereon.

Another object of my invention is to construct a device of this character which may be constructed upon a locomotive or car and operated by the engineer or motorman at times when it is necessary to employ means to facilitate the adhering of the wheels of the rolling-stock to the tracks upon which they travel, whereby the speed and pulling power of the engine or car will be greatly increased.

Briefly described, the device consists of two rubber-tired wheels which are mounted upon the framework of an engine or car and are adapted to be placed in engagement with the tracks when they are in a wet or damp condition, means being provided whereby the wheels may be placed in operation by the engineer or motorman when it is desired to use the same.

The construction employed to accomplish the above objects will be hereinafter more fully described, and specifically pointed out in the claims.

In describing the invention in detail reference is had to the accompanying drawings, forming a part of this application, and wherein like numerals indicate like parts throughout both views, in which—

Figure 1:
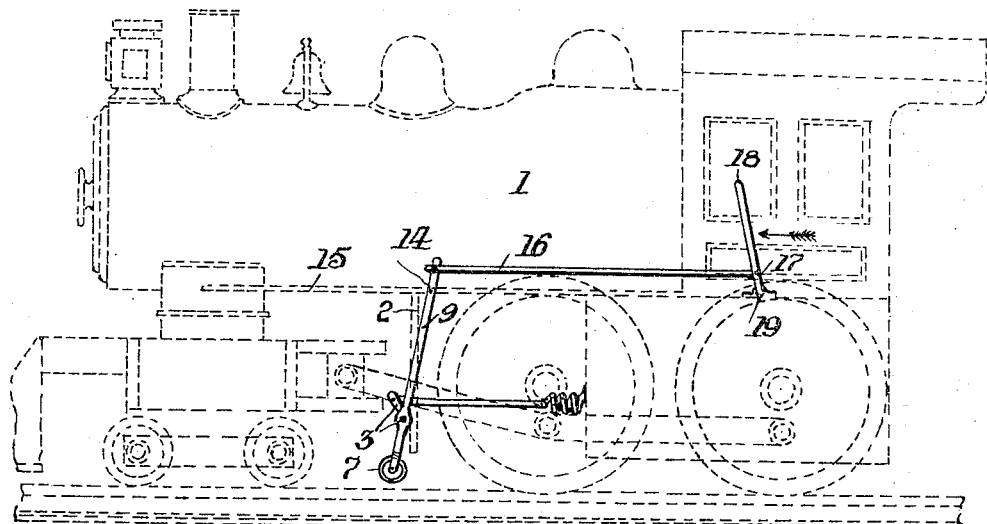
Figure 2:
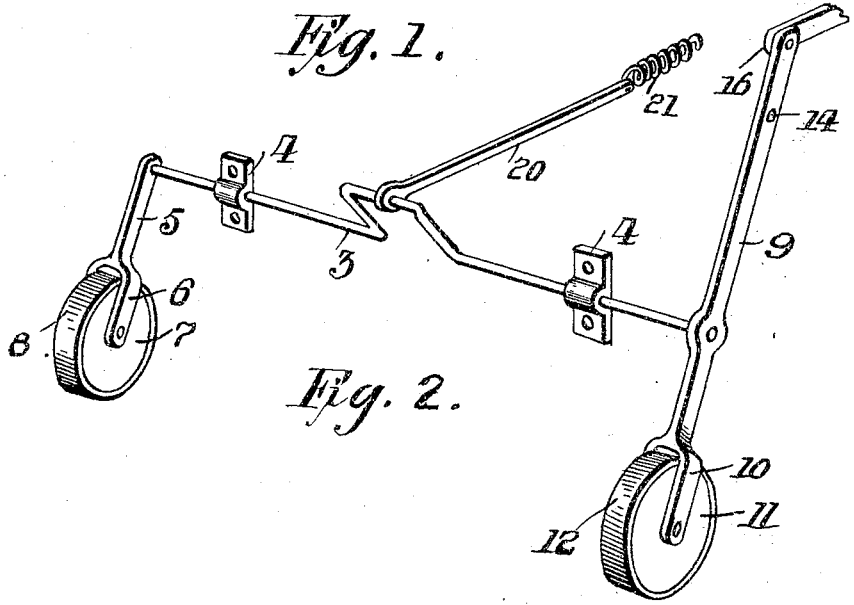

Figure 1 is a side elevation of my improved track-drying device as applied to a locomotive. Fig. 2 is a detail perspective view of the wheels and their operating shaft and levers.

In the accompanying drawings the reference-numeral 1 indicates a locomotive, which I have illustrated in dotted lines, and to the depending guide-yoke 2 of the locomotive I have mounted my improved track-drying device, which comprises an operating crank-shaft 3, which is journaled in brackets 4 4, secured to the guide-yoke 2 upon each side of the locomotive, and upon the one end of the shaft 3 is secured a depending arm 5, the lower end of which is bifurcated, as indicated at 6, and in the bifurcated members of the arm is journaled a wheel 7, having secured thereon a rubber tire 8. Upon the other end of the shaft is secured an arm 9, the lower end of which is bifurcated, as indicated at 10, and in the bifurcated members of this arm is journaled a wheel 11, having secured thereon a rubber tire 12. The upper end of the arm 9 is pivoted, as indicated at 14, to the running-board 15 or one of the appurtenant parts of the locomotive, and to the end of this arm is pivoted a rod 16, which extends rearwardly to the cab of the locomotive and is pivotally connected, as designated at 17, to a lever 18, which is pivoted, as indicated at 19, to the floor of the cab of the locomotive. The crank portion of the shaft 3 has connected to it a pivoted rod 20, to the end of which is connected a spring 21, said spring in turn being connected to the rear plate of the fire-box or to any immovable part of the locomotive suitably located.

The operation of my improved track-drying device is as follows: The wheels 7 and 11 are held in the elevated position from engagement with the tracks by the spring 21, and when it is desired to place the wheels in engagement with the tracks the lever 18 is moved in the direction of the arrow in Fig. 1 of the drawings, which, through the medium of the rod 16 and the arm 9, rotates the shaft 3, forcing the wheels 7 and 11 into engagement with the tread of the rails, and upon the wheels coming into contact with the rails the wheels will revolve and travel upon said rails, forcing off all water or like liquid which may lie upon the rails and drying the same, whereby the movement of the rolling-stock over the rails is more easily controlled by the operator of the car or engine.

While I have herein shown the wheels 7 and 11 as carrying rubber tires, it is obvious that these wheels may be made entirely of rubber, or in place of the rubber tires 8 and 12 material similar to rubber may be employed to accomplish the desired results, and I wish it to be understood that while I have herein shown the device as applied to a locomotive the same may be readily used in connection with a street-car or like vehicle, and when used in connection with a street-car suitable means may be employed for supporting the mechanism beneath the car, also means whereby the same may be operated by the foot of the motorman operating the car.

Having fully described my invention, what I claim as new, and desire to secure by Letters Patent, is—

1. In a device of the character described, the combination with a locomotive, of an operating crank-shaft carried by said locomotive, wheels having elastic peripheral surfaces and carried by said shaft, means actuated from the cab of the locomotive to engage said wheels with the railway-tracks, and means to normally hold said wheels out of engagement with said tracks, substantially as described.

2. In a device of the character described, the combination with a vehicle, of an operating crank-shaft carried by said vehicle, wheels carried by said shaft, said wheels having elastic peripheral surfaces and being adapted to engage the track upon which the vehicle travels, means carried by said vehicle to normally hold said wheels out of engagement with said track, and means carried by said vehicle to force said wheels into engagement with the tracks, substantially as described.

3. A device of the character described comprising an operating crank-shaft, arms carried by said shaft, wheels journaled in said arms, said wheels having elastic peripheral surfaces, and means for rotating said crank-shaft, substantially as described.

4. In a device of the character described, the combination with a vehicle, of an operating crank-shaft carried by said vehicle, depending arms carried by said shaft, wheels journaled in said arms, said wheels having elastic peripheral surfaces, means carried by said vehicle for rotating said shaft, and means carried by said vehicle to return the shaft to its normal position, substantially as described.

5. In a device of the character described, the combination with a traction-vehicle, of an operating crank-shaft journaled in the framework of said vehicle, rotatable wheels carried by said shaft, rubber tires carried by said wheels, means carried by said vehicle to rotate said shaft, and means to return said shaft to its normal position, substantially as described.

In testimony whereof I affix my signature in the presence of two witnesses.

LAWRENCE E. HERRON.

Witnesses:
   H. C. EVERT,
   K. H. BUTLER.